US006955106B2

United States Patent
Hallett

(10) Patent No.: US 6,955,106 B2
(45) Date of Patent: Oct. 18, 2005

(54) THREAD MAKING DEVICE

(76) Inventor: Thomas A. M. Hallett, Suite #3, 9804-112 Street, Edmonton, Alberta (CA) T5K 1L4

( * ) Notice: Subject to any disclaimer, the term of this patent is extended or adjusted under 35 U.S.C. 154(b) by 97 days.

(21) Appl. No.: 10/773,938

(22) Filed: Feb. 6, 2004

(65) Prior Publication Data

US 2005/0176515 A1 Aug. 11, 2005

(51) Int. Cl.[7] .................................................. B23B 1/00

(52) U.S. Cl. ............................ 82/110; 407/73; 407/77; 470/87

(58) Field of Search ............................ 82/110; 470/87, 470/97, 107; 29/27 R; 407/73, 76, 77, 82, 407/88, 92, 97, 98

(56) References Cited

U.S. PATENT DOCUMENTS

| | | | |
|---|---|---|---|
| 1,988,770 A * | 1/1935 | Alexander | 408/230 |
| 5,059,069 A * | 10/1991 | Lagerberg | 407/113 |
| 6,349,626 B1 * | 2/2002 | Nakaminami et al. | 82/132 |

* cited by examiner

*Primary Examiner*—Willmon Fridie, Jr.
(74) *Attorney, Agent, or Firm*—Frank J. Dykas; Dykas, Shaver & Nipper

(57) ABSTRACT

A thread making device that has a thread form with controlled height adjustment. The thread making device is formed from a threading cartridge mounted on a threading bar. A thread form with a cutting edge is secured in a pocket on the threading cartridge bounded on one side by an adjustable height clamp, whose position relative to the threading cartridge is controlled by serrated faces on the adjustable height clamp and the threading cartridge. The thread form has a thickness extending in a wear direction, and the serrations of the serrated faces allow height adjustment of the adjustable height clamp in the wear direction.

6 Claims, 6 Drawing Sheets

THREAD MAKING DEVICE

BACKGROUND OF THE INVENTION

Threads are machined in work pieces by thread forms mounted on threading bars. Typically, the thread forms are secured in removable threading cartridges. As the thread form wears, the thread form is ground and shaped, and then re-positioned on the threading cartridge using shims to ensure a constant height position of the cutting edge of the thread form on the threading bar. Imprecision in the position of the thread form can cause poor quality threading on the work piece. This invention is directed to an improved threading cartridge with a readily height adjustable thread form.

SUMMARY OF THE INVENTION

There is therefore provided a thread making device that has a thread form with controlled height adjustment. The thread making device is formed from a threading cartridge mounted on a threading bar. A thread form with a cutting edge is secured in a pocket on the threading cartridge bounded on one side by an adjustable height clamp, whose position relative to the threading cartridge is controlled by serrated faces on the adjustable height clamp and the threading cartridge. The thread form has a thickness extending in a wear direction, and the serrations of the serrated faces allow height adjustment of the adjustable height clamp in the wear direction.

In further aspects of the invention, (1) the thread form is secured in a pocket bounded on a first side by the adjustable height clamp and on a second side opposite to the first side by a spring clamp, (2) the pocket is bounded on a third side by an abutment from the threading cartridge on the side of the thread form opposite to the cutting edge, the abutment having a face that is parallel to the cutting edge, (3) the pocket is bounded on a fourth side by a face on the threading cartridge that is parallel to the first serrated face, (4) the thread form and the adjustable height clamp abut each other on the first side of the pocket along a joint that prevents movement of the thread form away from the fourth side and (5) the abutment on the threading cartridge defines one side of a slot that confines movement of the adjustable height clamp in the wear direction.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

Figure 1:
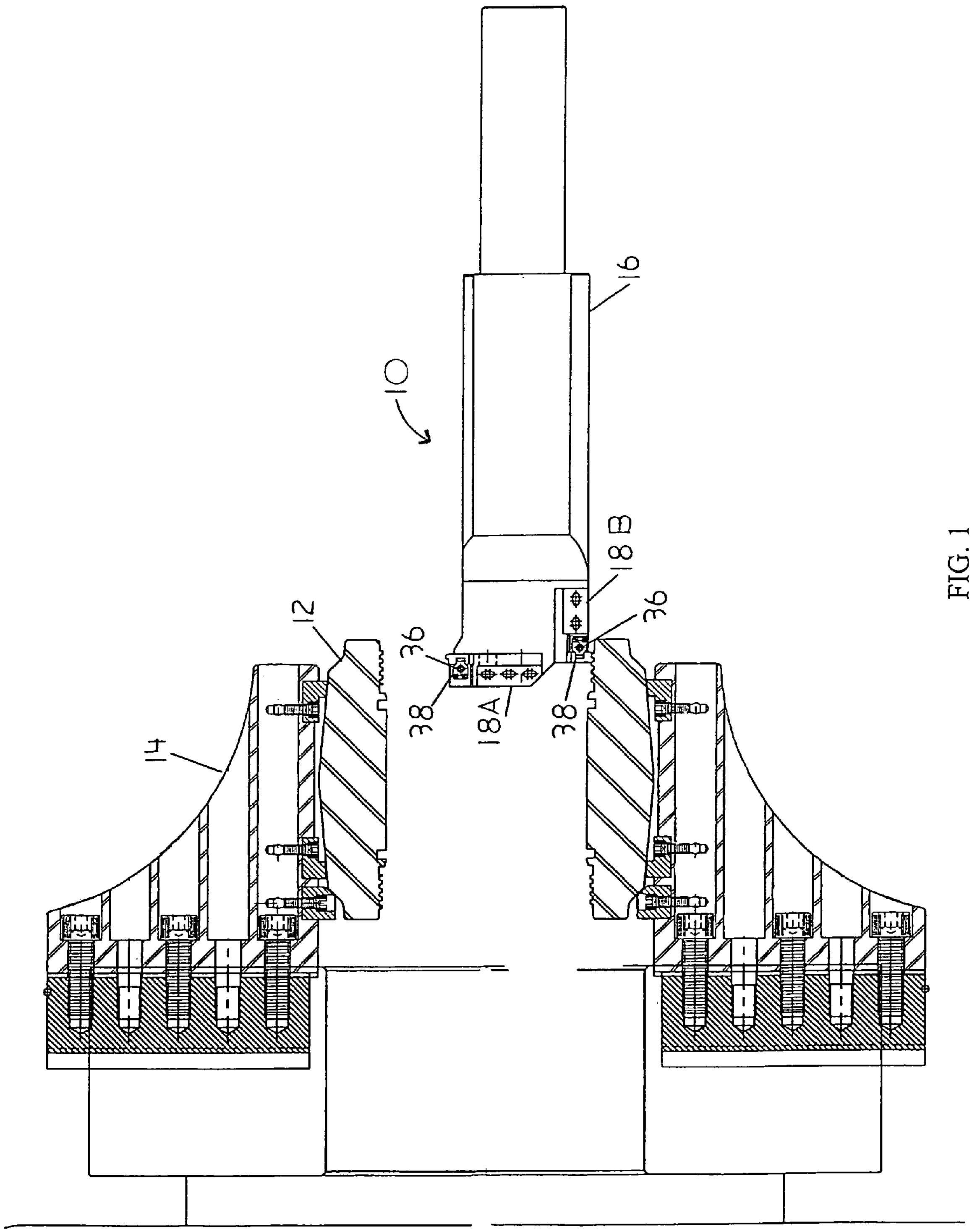
FIG. 1 is a side view of a thread making device according to the invention, in position to cut a thread on a front end of a work piece held by a chuck of a lathe, the work piece and chuck both being shown in section.
Figure 2:
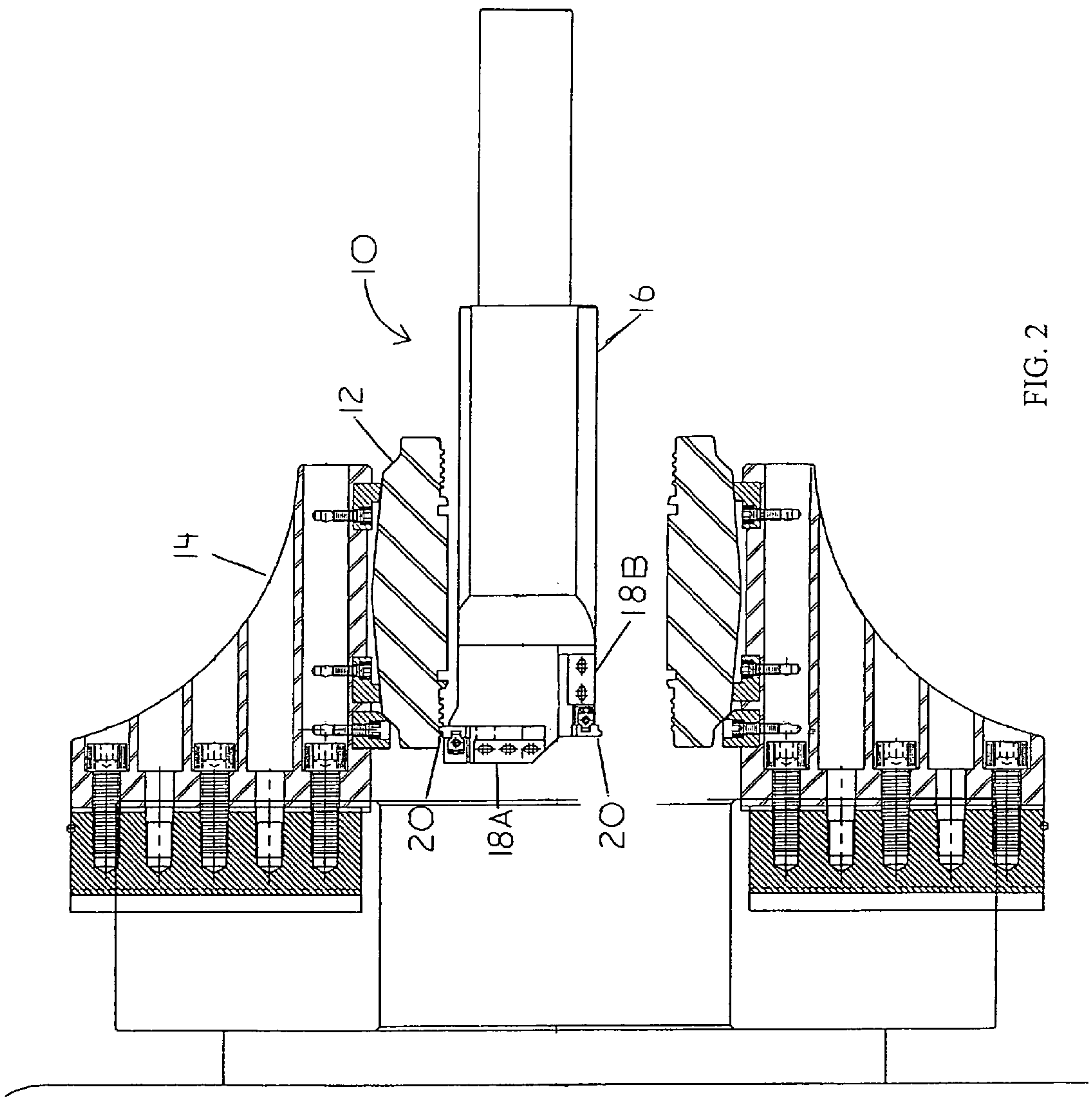
FIG. 2 is a side view of a thread making device according to the invention, in position to cut a thread on a rear end of a work piece held by a chuck of a lathe, the work piece and chuck both being shown in section.
Figure 3E:
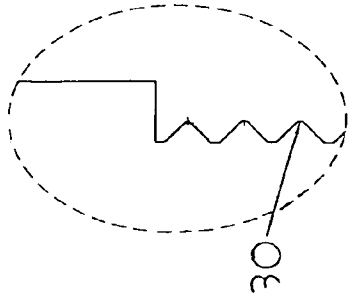
FIGS. 3A–3E are respectively a side view, top view, first end view, second end view and thread detail of a threading cartridge according to the invention.
Figure 3D:
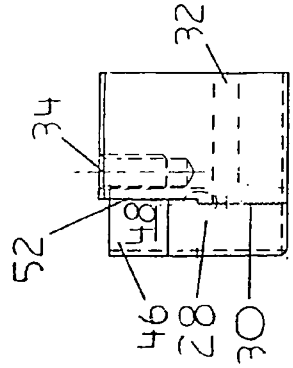
Figure 3B:
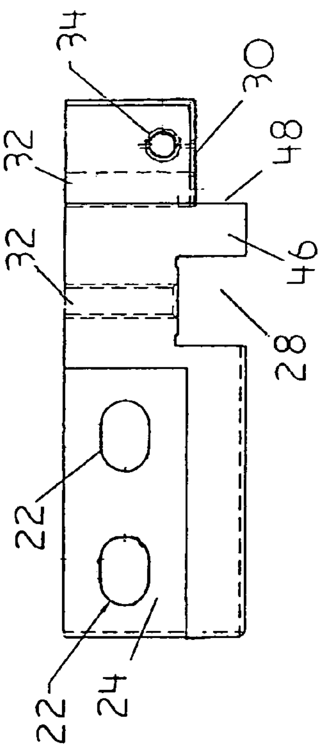
Figure 3A:
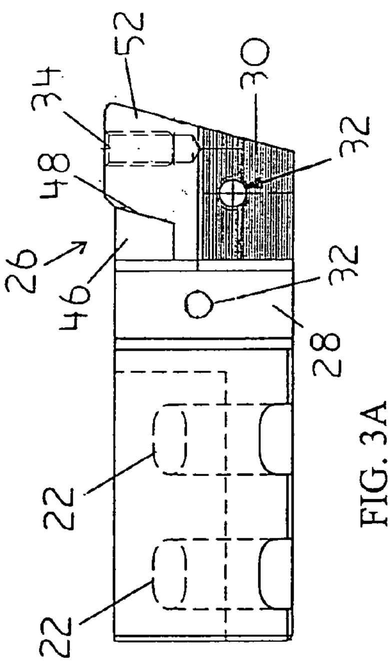
Figure 3C:
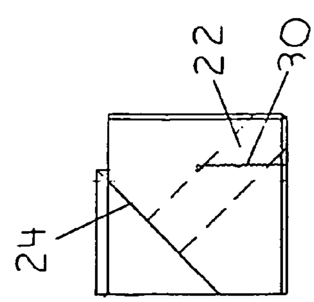
Figure 4D:
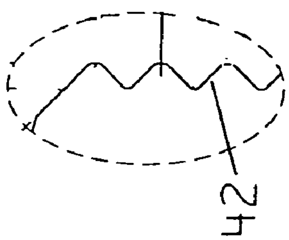
FIGS. 4A–4D are respectively a side view, top view, end view and thread detail of an adjustable height clamp for use with a threading cartridge according to the invention.
Figure 4C:
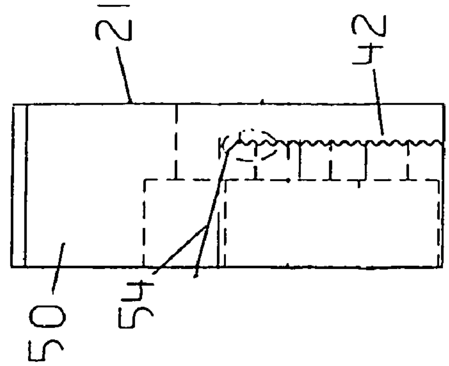
Figure 4B:
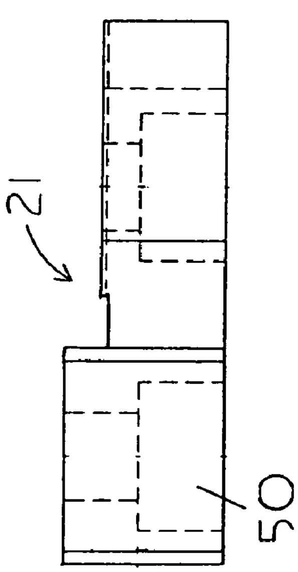
Figure 4A:
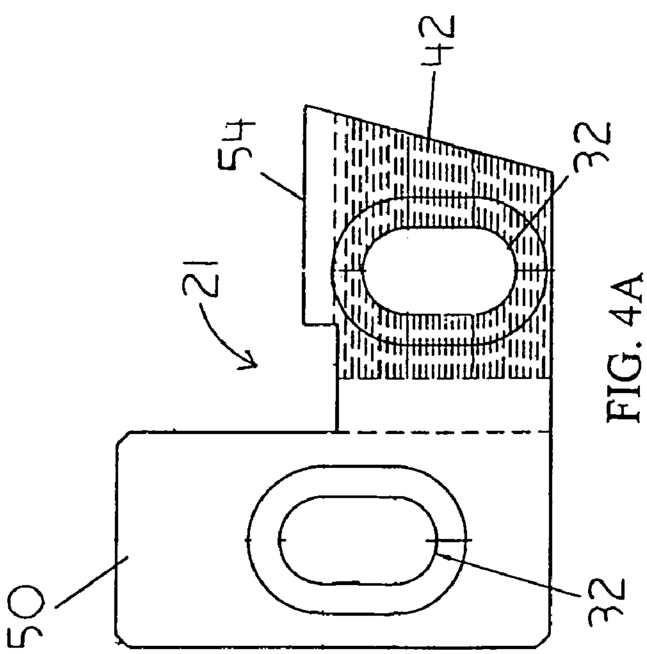

Referring to FIGS. 1 and 2, a thread making device 10 is shown in position to machine a thread on one end of a work piece 12 (FIG. 1) and on the other end of the work piece 12 (FIG. 2). The work piece 12 is held by a chuck 14 of a lathe in conventional fashion. The thread making device 10 is formed from a threading bar 16 that holds a pair of threading cartridges 18A, 18B oriented on the threading bar 16 respectively to machine rear and front threads on the work piece 12. Each threading cartridge 18A, 18B holds a thread form 20 secured by an adjustable height clamp 21 (FIGS. 4A–4D).

The threading cartridges 18A and 18B differ in the orientation of the thread form 20 on the end of the threading cartridge 18A, 18B, and also in the orientation of the threading cartridges 18A, 18B on the threading bar 16 but otherwise are designed in the same manner. The threading cartridge 18A will now be described with reference to FIGS. 3A–3E. The threading cartridge 18A is machined from a 1 inch steel bar, and the threading bar 16 has a corresponding shelf for receiving the threading cartridge 18A. The threading cartridge 18A is provided with openings 22 angled at 45° for screws to pass through and into the threading bar 16 to secure the threading cartridge 18A on the threading bar 16. The threading cartridge 18A may be machined at the openings 22 to provide a flat face 24 to secure the screws against. At the cutting end 26 of the threading cartridge 18A, a slot 28 is machined for receiving a thread form 20 (FIGS. 5A–5C) and adjustable height clamp 21 (FIGS. 4A–4D).

The slot 28 in the threading cartridge 18A has a serrated face 30, and elongated openings 32 for receiving screws that secure the adjustable height clamp 21 to the threading cartridge 18A. In addition, the threading cartridge 18A has an opening 34 for receiving a screw 36 that secures a spring clamp 38 on top of the thread form 20. The adjustable height clamp 21 fits in the slot 28 and is secured to the threading cartridge 18A by screws passing through openings 40 into openings 22 in the threading cartridge 18A. The adjustable height clamp 21 is provided with a serrated face 40 that engages the serrated face 30 of the threading cartridge 18A.

Figure 5B:
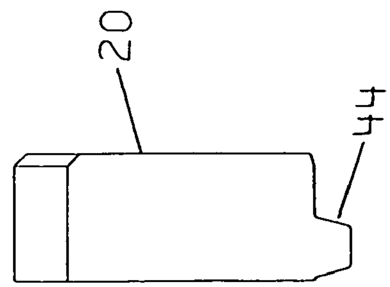
FIGS. 5A–5C are respectively a side view, top view and end view of a thread form for use with a threading cartridge according to the invention.
Figure 5C:
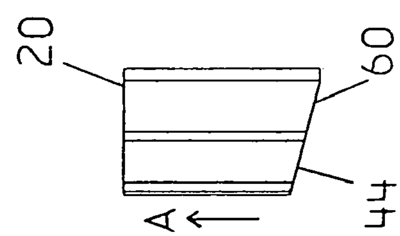
Figure 5A:
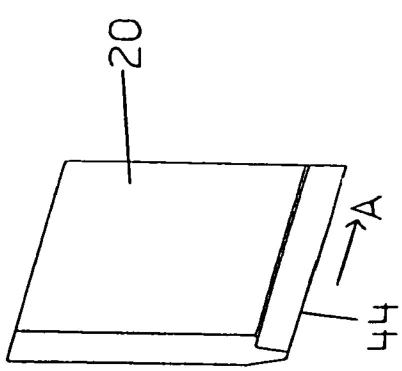
Figure 6:
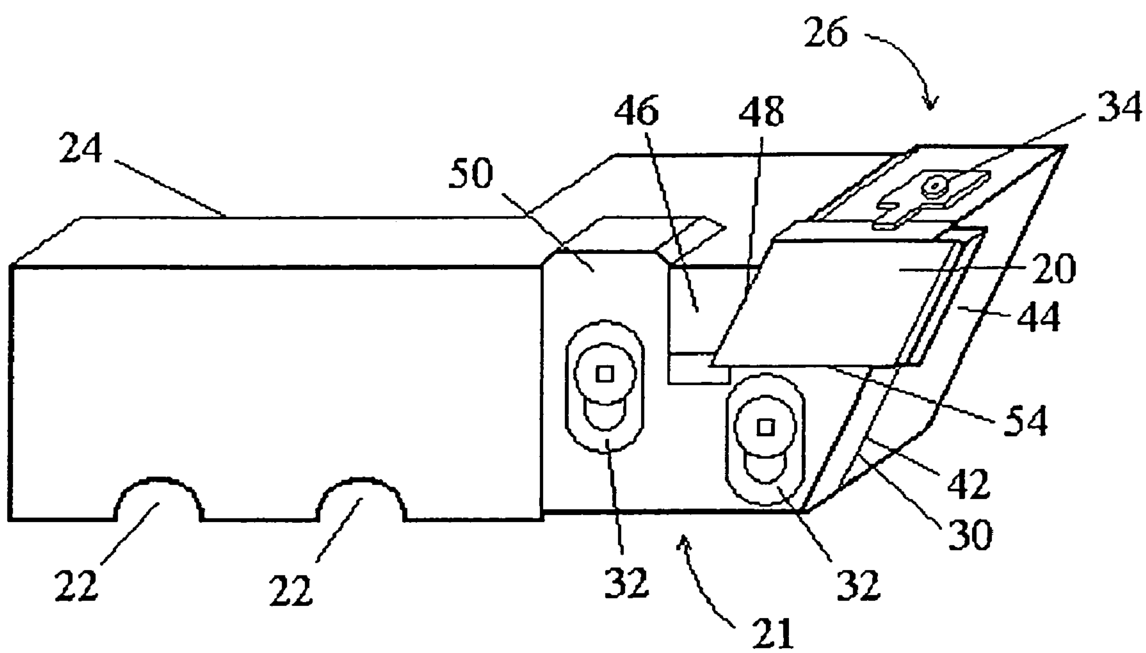
FIG. 6 is a perspective view of a thread making device according to the invention.

Thread form 20 has a conventional construction as shown in FIGS. 5A–5C, with a cutting edge 44 having a thickness extending in a wear direction A. The thread form 20 is mounted on the threading cartridge 18A for cutting a thread along a curved surface of a rotating workpiece such as the work piece 12. The adjustable height clamp 21 is secured to the threading cartridge 18A with serrations of the serrated face 42 engaged with serrations of the serrated face 30 and is clamped against the thread form 20 in cooperation with the spring clamp 38 to hold the thread form 20 on the threading cartridge 18A. The thread form 20 is thus secured in a pocket bounded on a first side by the adjustable height clamp 21 and on a second side opposite to the first side by the spring clamp 38. The serrations of each of the serrated faces 30, 42 are oriented in a direction that allows height adjustment of the adjustable height clamp 21 in the wear direction A.

The adjustable height clamp 21 is movable in relation to the threading cartridge 18A in the wear direction A since the position of the adjustable height clamp 21 is constrained in the wear direction A only by the position of the screws in the elongated openings 32. This movement of the adjustable height clamp 21 allows selective engagement of the serrations of the serrated faces 30, 42 to maintain the cutting edge 44 at a constant height within a tolerance established by the width of individual serrations of the serrated faces 30, 42. The adjustable height clamp 21 may be secured at the selected location by fastening the screws in the openings 32 and the second serrated face.

The threading cartridge 18A is also provided with an abutment 46 that bounds the pocket containing the thread form 20 on a third side. The abutment 46 has an angled face 48 that is parallel to the cutting edge 44. This allows the thread form 20 to slide along the abutment 46 and maintain constant height of the cutting edge 44. An extension 50 of the adjustable height clamp 21 is received between the abutment 46 and the main body of the threading cartridge 18A to help maintain alignment of the adjustable height clamp 21 and the thread form 20.

The thread form 20 thus sits in a pocket established between the adjustable height clamp 21, spring clamp 38, abutment 46 and a face 52 on the threading cartridge 18A that is parallel to the serrated face 30. To assist in preventing movement of the thread form 20 out of the pocket away from the face 52, the upper face 54 of the adjustable height clamp 21 angles inward and down and engages a correspondingly sloped face 60 on the thread form 20. The joint between the faces 54 and 60 helps to prevent movement of the thread form 20 away from the face 52.

A person skilled in the art could make immaterial modifications to the invention described in this patent document without departing from the invention.

What is claimed is:

1. A thread making device, comprising:

a threading bar;

a threading cartridge mounted on the threading bar, the threading cartridge having a first serrated face;

a thread form mounted on the threading cartridge for cutting a thread along a curved surface of a rotating workpiece, the thread form having a cutting edge;

an adjustable height clamp having a second serrated face, the adjustable height clamp being secured to the threading cartridge with serrations of the first serrated face engaged with serrations of the second serrated face and clamped against the thread form to hold the thread form on the threading cartridge;

the thread form having a thickness extending in a wear direction;

the serrations of each of the first serrated face and the second serrated face being oriented in a direction that allows height adjustment of the adjustable height clamp in the wear direction; and the adjustable height clamp being movable in the wear direction to selectively engage serrations of the first serrated face and the second serrated face and maintain the cutting edge at a constant height within a tolerance established by the width of individual serrations of the first serrated face and the second serrated face.

2. The thread making device of claim 1 in which the thread form is secured in a pocket bounded on a first side by the adjustable height clamp and on a second side opposite to the first side by a spring clamp.

3. The thread making device of claim 1 in which the pocket is bounded on a third side by an abutment from the threading cartridge on the side of the thread form opposite to the cutting edge, the abutment having a face that is parallel to the cutting edge.

4. The thread making device of claim 3 in which the pocket is bounded on a fourth side by a face on the threading cartridge that is parallel to the first serrated face.

5. The thread making device of claim 4 in which the thread form and the adjustable height clamp abut each other on the first side of the pocket along a joint that prevents movement of the thread form away from the fourth side.

6. The thread making device of claim 3 in which the abutment on the threading cartridge defines one side of a slot that confines movement of the adjustable height clamp in the wear direction.

* * * * *